United States Patent [19]

Katagawa

[11] Patent Number: 5,020,099
[45] Date of Patent: May 28, 1991

[54] PRIVATE BRANCH EXCHANGE

[75] Inventor: Hiromi Katagawa, Fukuoka, Japan

[73] Assignee: Matsushita Electric Industrial Co., Ltd., Osaka, Japan

[21] Appl. No.: 419,393

[22] Filed: Oct. 10, 1989

[30] Foreign Application Priority Data

Oct. 14, 1988 [JP] Japan .................... 63-260051

[51] Int. Cl.$^5$ ................ H04M 3/22; H04M 7/14
[52] U.S. Cl. .................... 379/234; 379/235; 379/257; 379/283
[58] Field of Search ........... 379/234, 235, 282, 283, 379/284, 286, 287, 257

[56] References Cited

U.S. PATENT DOCUMENTS 3,330,911 7/1967 Cohrt ........................ 379/207
3,790,719 2/1974 Montague et al. .............. 379/225

Primary Examiner—Thomas W. Brown
Attorney, Agent, or Firm—Stevens, Davis, Miller & Mosher

[57] ABSTRACT

Instead of setting the type of a dial signal for a central office line connected to a private branch exchange to either a DTMF signal or a pulsed signal externally of the private branch exchange, the line is acquired and a DTMF signal is transmitted from the private branch exchange to the line so that the line is recognized as a dial line for the DTMF signal when a dial tone coming from the line disappears but as a dial line for the pulsed signal when the dial tone does not disappear. Results of recognition are set in the private branch exchange and the type of the dial signal for the line is set automatically in accordance with the results.

6 Claims, 6 Drawing Sheets

PRIVATE BRANCH EXCHANGE

BACKGROUND OF THE INVENTION

This invention relates to a private branch exchange (hereinafter referred to as PBX) capable of performing the mode setting by which the type (hereinafter referred to as dial mode) of a dial or selection signal transmitted from the PBX to a central office line connected thereto is set to be of either a dual tone modulated-frequency signal (hereinafter referred to as DTMF signal) or a pulsed dial signal (hereinafter referred to as pulsed signal).

A PBX related to the present invention is shown in FIG. 5 and it operates as will be described with reference to FIGS. 6 and 7. The PBX shown in FIG. 5 is generally designated by reference numeral 500 and is constructed of components to be described below.

A relay 502 for acquiring a central office line 508 is controlled by a controller 501 in order that establishment/release of a DC loop for a central office exchange 509 is carried out to inform the exchange 509 of transmission, response or clear-down by the PBX, and when the line 508 is acquired for signal transmission, the DC loop is turned on and off intermittently to transmit the pulsed signal. A capacitor 503 is adapted to block the DC signal on the line 508 and pass only a talking sound band signal to a channel unit 505. A DTMF signal transmitter 504 is connected to the capacitor 503 and operated under the control of the controller 501 to transmit a DTMF signal to the exchange 509 by way of the line 508. The channel unit 505 is operated also under the control of the controller 501 to establish connection of the talking sound band signal between the line 508 and an extension. A memory 506 coupled to the controller 501 has a program area PA for storing a program which accords with flow charts as shown in FIGS. 6 and 7, and the controller 501 executes a series of processings in accordance with the program. The memory 506 also has a memory area MA for storing a series of dial signal data transmitted from the extension and information about the dial mode for line 508 which has been registered in advance by means of a console 507. The console 507 is coupled to the controller 501 and used, when the PBX unit is installed or the PBX is required to be inspected for maintenance, to allow the operator to input a program and observe information display. The controller 501 is operable to control the previously-described components in accordance with the control program stored in the program area PA of the memory 506.

The flow charts of FIGS. 6 and 7 are useful to explain the operation of the PBX 500 shown in FIG. 5.

In particular, the dial mode for the central office exchange 509 can be determined by means of the console 507 in accordance with the FIG. 6 flow chart indicative of programming of the dial mode.

In step 601, the operator manipulates the console 507 to input the programming to the controller 501. In step 602, the dial mode for the exchange 509 is decided on the basis of the thus inputted programming data. If the DTMF signal mode is selected, information to that effect is set in the memory area MA of the memory 506 in step 603. If the pulsed signal mode is selected, information to that effect is set in the memory area MA in step 604.

Then, a dial or selection signal is transmitted to the line 508 in accordance with the flow chart shown in FIG. 7.

In step 701, the relay 502 is turned on to acquire the line 508. Subsequently, in step 702, the dial mode previously registered in the memory area MA of the memory 506 by means of the console 507 is decided. If the dial mode is determined to be the DTMF signal mode, it is decided in step 703 whether dial data transmitted from the extension is present in the memory area MA of the memory 506. If present, in step 704, the DTMF signal transmitter 504 is driven to transmit one digit of the dial data in the form of the DTMF signal and thereafter the procedure returns to the preceding step 703, at which the presence of dial data in the memory area MA is again decided. The processing through the steps 703 and 704 is repeated until the transmission of all dial data is completed. Conversely, if the absence of dial data in the memory area is decided in step 703, the procedure proceeds to step 707 for ordinary talking processing, thus completing the dial transmission processing.

If the dial mode is determined to be the pulsed signal mode in step 702, the procedure proceeds to step 705 at which it is decided, as in the case of the step 703, whether dial data is present in the memory area MA. If present, the procedure proceeds to step 706 at which the relay 502 is driven to transmit one digit of the dial data in the form of the pulsed signal to the line 508 and thereafter the procedure returns to the step 705. Then, the processing through the steps 705 and 706 is repeated until the transmission of all dial data stored in the memory area MA is completed. Thereafter, when the absence of dial data is determined in step 705, the procedure proceeds to step 707 for ordinary talking processing, thus completing the dial transmission processing.

SUMMARY OF THE INVENTION

An object of this invention is to provide a telephone apparatus capable of recognizing the dial mode for a central office line connected to the apparatus.

Another object of this invention is to provide a telephone apparatus capable of determining, when a pulsed signal or a DTMS signal is transmitted, whether the transmitted signal is valid.

Still another object of this invention is to provide a telephone apparatus which can recognize the dial mode for a central office line by detecting whether a dial tone has disappeared.

According to the invention, the PBX can automatically decide the dial mode of a dial signal transmitted to a central office line at the time that the PBX unit is installed or inspected for maintenance, so as to release the operator from engaging in setting the dial mode for individual lines and consequently maintenance with high efficiency.

DESCRIPTION OF THE PREFERRED EMBODIMENTS

A preferred embodiment of a talking transmitter according to the invention will now be described with reference to FIGS. 1, 2, 3 and 4.

Figure 1:
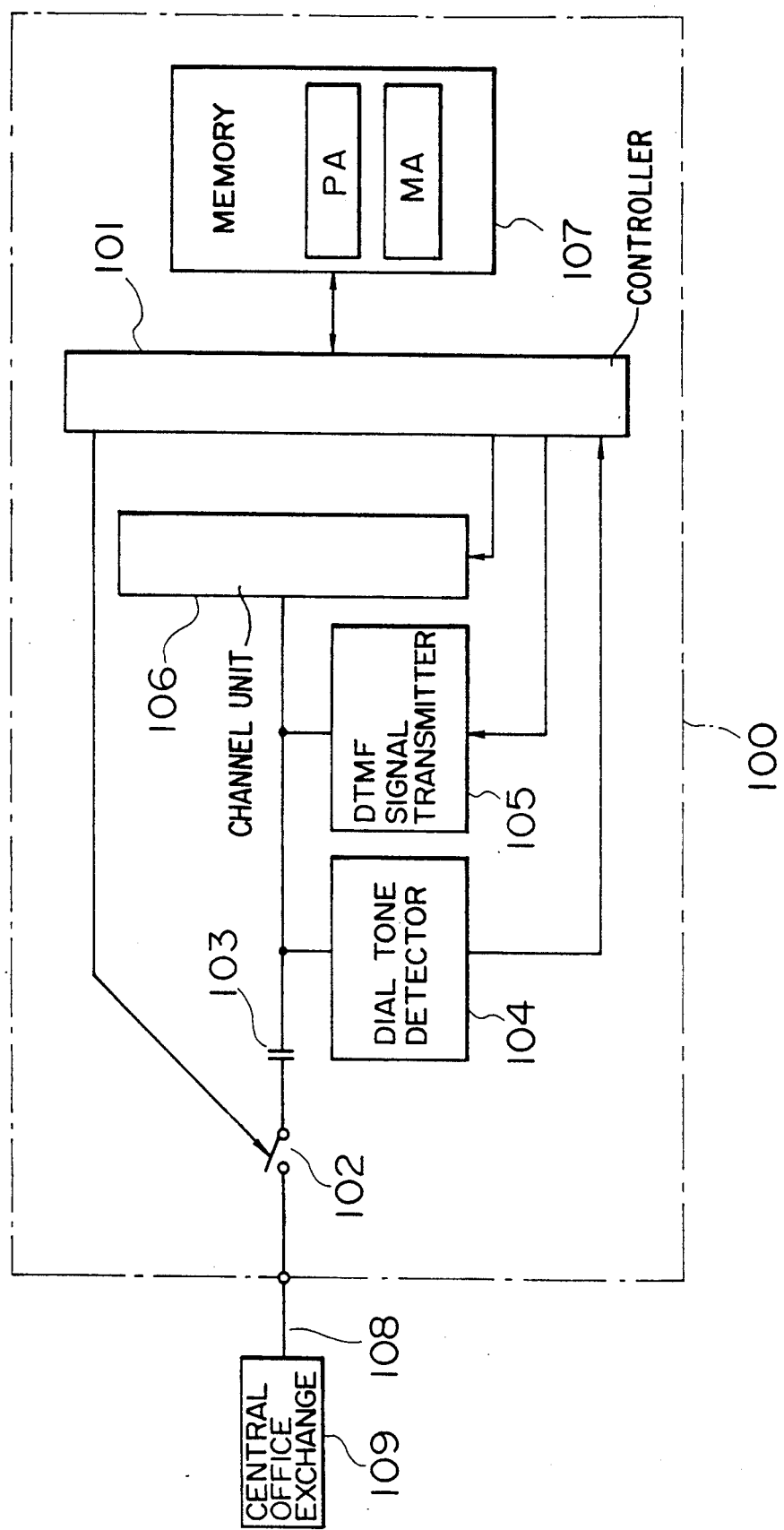
FIG. 1 is a block diagram showing the construction of a PBX according to an embodiment of the invention.

Referring in particular to FIG. 1, a PBX of the invention is schematically illustrated and it has a PBX unit generally designated by reference numeral 100.

Figure 2:
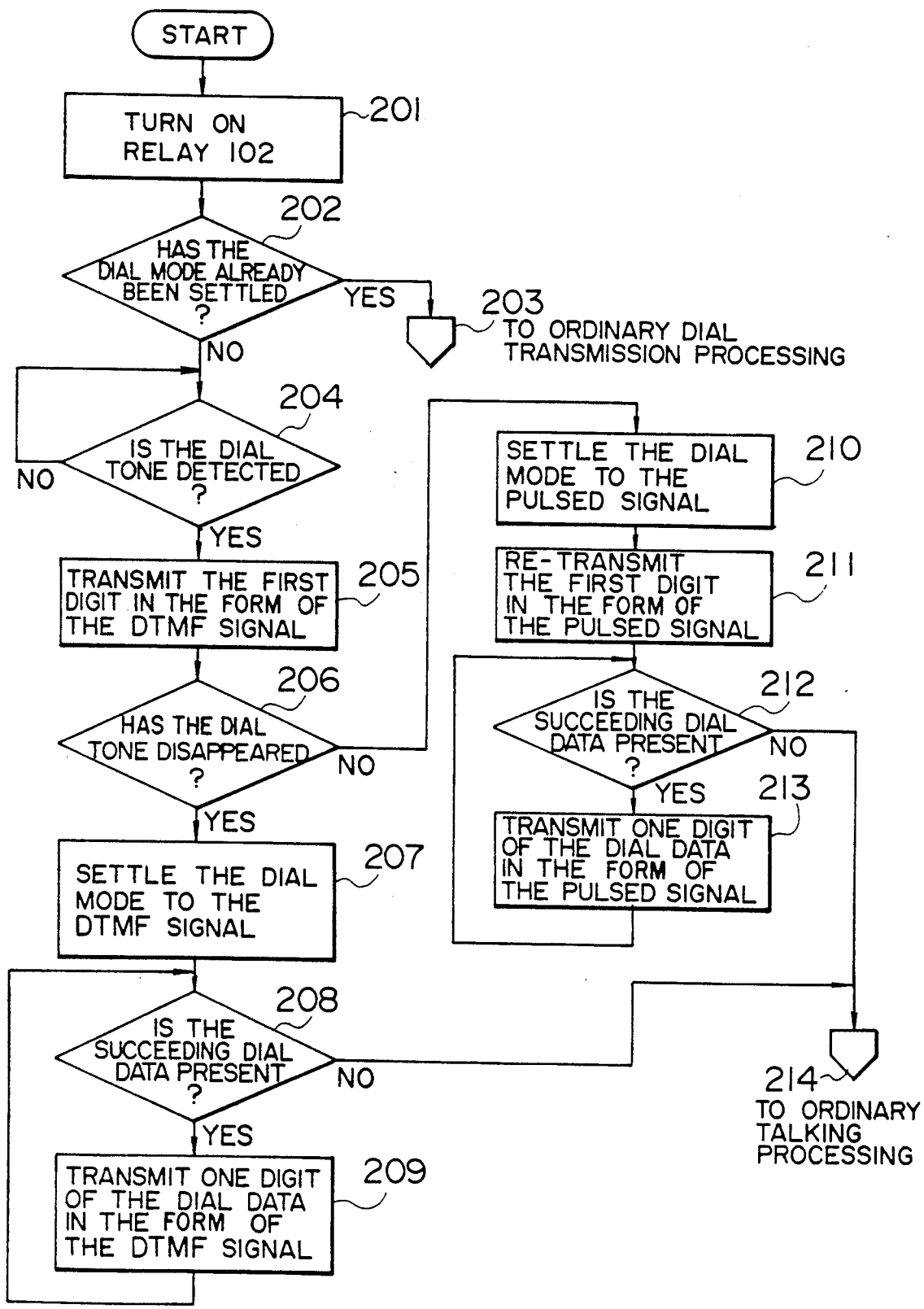
FIG. 2 is a flow chart showing processings in the FIG. 1 embodiment.

A relay 102 for acquisition of a central office line 108 is controlled by a controller 101 in order that establishment/release of a DC loop for a central office exchange 109 is carried out to inform the exchange 109 of transmission, response or cleardown by the PBX, and when the line 108 is acquired for signal transmission, the DC loop is turned on and off intermittently to transmit the pulsed signal. A capacitor 103 is adapted to block the DC signal on the line 108 and pass only a talking sound band signal to a channel unit 106. A dial tone detector 104 is connected to the capacitor 103 and operable to detect the presence or absence of a dial tone which is transmitted from the exchange 109 at the time that the line 108 is acquired for signal transmission, producing detection information supplied to the controller 101. A DTMF signal transmitter 105 is also connected to the capacitor 103 and operated under the control of the controller 101 to transmit a dial or selection signal in the form of a DTMF signal to the exchange 109 by way of the line 108. The channel unit 106 is operated also under the control of the controller 101 to establish connection of the talking sound band signal between the line 108 and an extension. A memory 107 coupled to the controller 101 has a program area PA for storing a program which accords with a flow chart as shown in FIG. 2, and the controller 101 executes a series of processings in accordance with the program. The memory 107 also has a memory area MA for storing a series of dial signal data transmitted from the extension and information about the dial mode for line 108 which has been determined through the procedure pursuant to the flow chart of FIG. 2. The controller 101 is operable to control the above-described components in accordance with the control program stored in the program area PA of the memory 107.

The flow chart of FIG. 2 is useful to explain the operation of the PBX of the present invention.

In step 201, the line 108 is acquired for signal transmission so that a dial or selection signal may be transmitted to the central office exchange 109. Subsequently, in step 202, the dial mode for line 108 stored in the memory area MA of the memory 107 is confirmed. If the dial mode has not been settled yet, the procedure proceeds to step 204 at which the dial tone detector 104 is operated to detect a dial tone from the line 108. This step 204 repeats itself until the dial tone is detected. With the dial tone detected in step 204, the procedure proceeds to step 205 at which the DTMF signal transmitter 105 is driven to transmit, in the form of the DTMF signal, the first digit of the dial data stored in the memory area MA of the memory 107. Subsequently, it is decided in step 206 whether the central office exchange 109 acknowledges the first digit of the DTMF signal to stop transmitting the dial tone. When the transmission of the dial tone has disappeared, the dial mode information stored in the memory area MA of the memory 107 is settled to the DTMF signal mode in step 207. However, if in step 207 the transmission of the dial tone has not disappeared, the procedure proceeds to step 210 at which the dial mode information stored in the memory area MA of the memory 107 is settled to the pulsed signal mode.

When the dial mode is set to the DTMF signal mode in the step 207 as described previously, the procedure proceeds to step 208 at which it is decided whether the second digit, following the first digit, and the ensuing digits of the dial data are present in the memory area MA. If present, in step 209, one digit of the dial data is transmitted in the form of the DTMF signal to the line 108. Thereafter, the procedure returns to the step 208 so that the processing through the steps 208 and 209 is repeated until the transmission of all dial data is completed. When completion of the transmission of all dial data is determined in step 208, the procedure passes by the step 208 to reach step 214 for ordinary talking processing, thus completing the dial transmission processing.

When in step 210 the dial mode is settled to the pulsed signal mode, indicating that the first digit of the dial data transmitted previously in the form of the DTMF signal in step 205 is invalid for the central office exchange 109, the procedure proceeds to step 211 at which the relay 102 is driven to re-transmit the first digit now in the form of the pulsed signal. In the following steps 212 and 213, as in the previously-described steps 208 and 209, the processing through the steps 212 and 213 repeats itself until all of the dial data in the memory area MA of the memory 107 have been transmitted in the form of the pulsed signal by driving the relay 102. When completion of the transmission of all dial data is confirmed in step 212, the procedure proceeds to the step 214 for ordinary talking processing, thus completing the dial transmission processing.

Thus, controller 101, relay 102 and DTMF signal transmitter 105 constitute a signal transmission means which selectively transmits a dial signal in either a first mode or a second mode to central office exchange 109, i.e., the first mode is a DTMF signal and the second mode is a pulsed signal.

Figure 7:
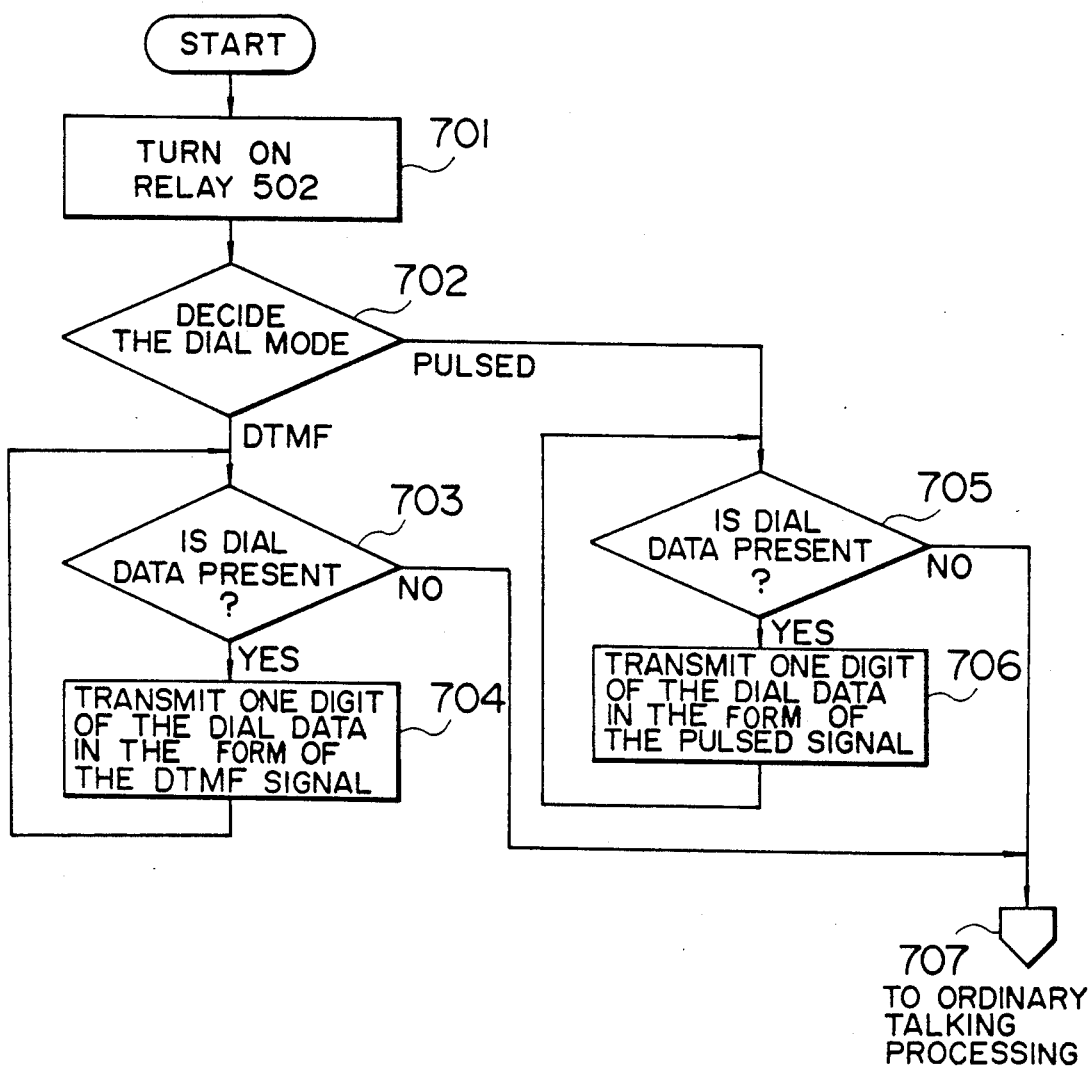

Incidentally, when it is indicated in the preceding step 202 that the dial mode in the memory area MA of the memory 107 has already been settled to either the DTMF signal mode or the pulsed signal mode through a series of processings in the succeeding steps, the procedure proceeds to the step 702 shown in FIG. 7 of the related art so that step 203 in FIG. 2 for ordinary dial processing may be executed.

As is clear from the foregoing, the processings in step 204 and the ensuing steps are executed when the dial mode information in the memory area MA of the memory 107 is initialized upon start-up of the PBX power supply or execution of certain operations and thereafter one transmission operation to the line 108 is initially done by the user of an extension. Therefore, once the dial mode is settled, the execution of the ordinary dial transmission processing can follow.

A series of steps 204 to 209 in the flow chart of FIG. 2 will be described in greater detail by referring to a timing chart of FIG. 3.

Figure 3:
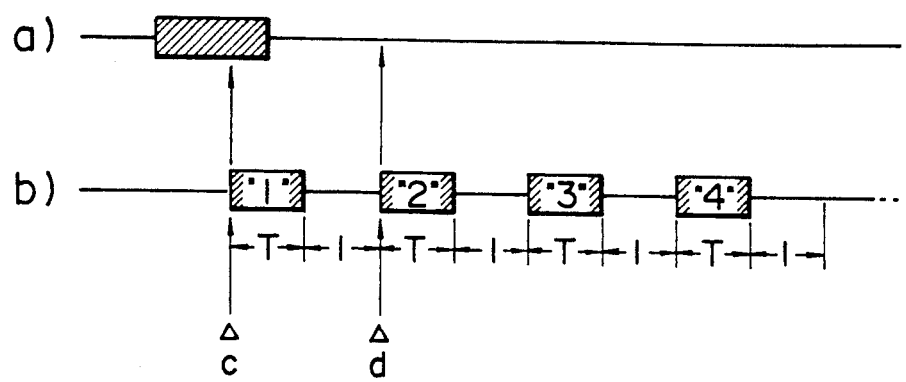
FIGS. 3 and 4 are timing charts showing signals appearing in the FIG. 1 embodiment.

Illustrated at section a) in FIG. 3 is the transmission state of a dial tone which is transmitted from the central office exchange 109 connected to the line 108. The dial tone is indicated by a hatched block. Illustrated at section b) is a dial signal transmitted from the PBX 100 to the line 108. Numerals in hatched blocks signify dial data pieces or digits.

When in step 204 the dial tone is detected at a time point c, the first digit of the dial data is transmitted in the form of the DTMF signal in step 205. This transmission is defined by a DTMF signal burst T termed "1" and an inter-digit pause I. In step 206, the central office exchange 109 detects the DTMF signal and it is decided at a time point d whether the dial tone has disappeared. In this case, the dial tone has already disappeared and therefore in step 207 the dial mode is settled to the DTMF signal mode and the transmission of the dial data in the form of the DTMF signal continues through the succeeding steps 208 an 209 until the transmission of all dial data is completed. This transmission is defined by a DTMF signal burst T termed "2" and an inter-digit pause I, a DTMF signal burst T termed "3" and an inter-digit pause I and a DTMF signal burst T termed "4" and an inter-digit pause I.

Figure 4:
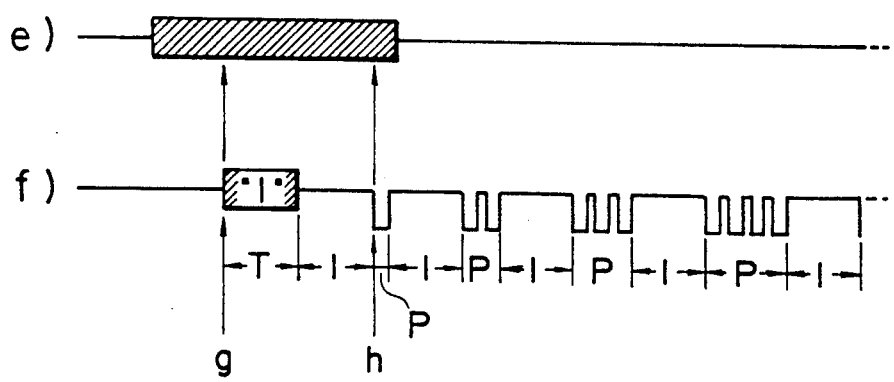
Figure 5:
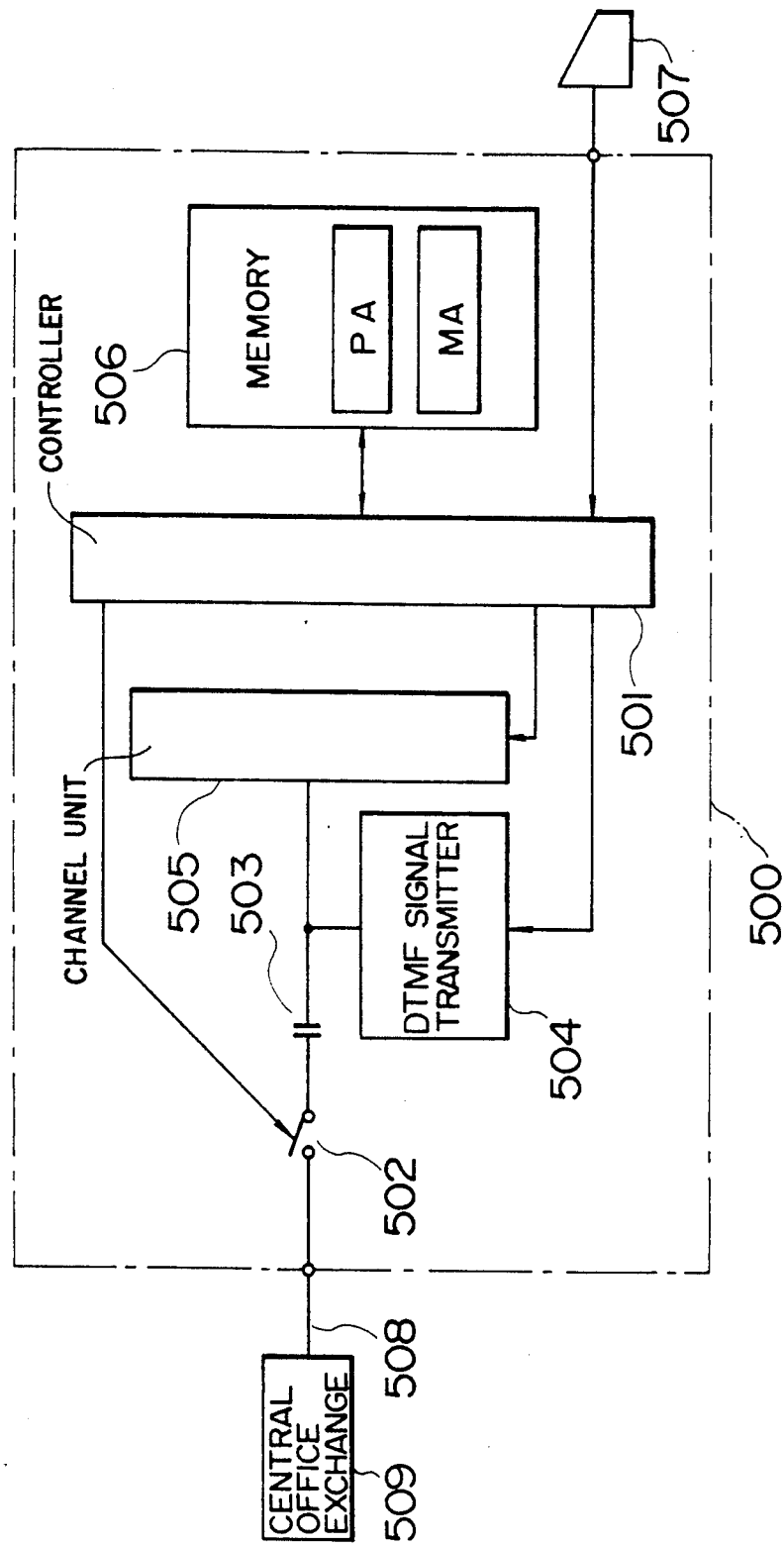
FIG. 5 is a block diagram showing the construction of a PBX related to the present invention.
Figure 6:
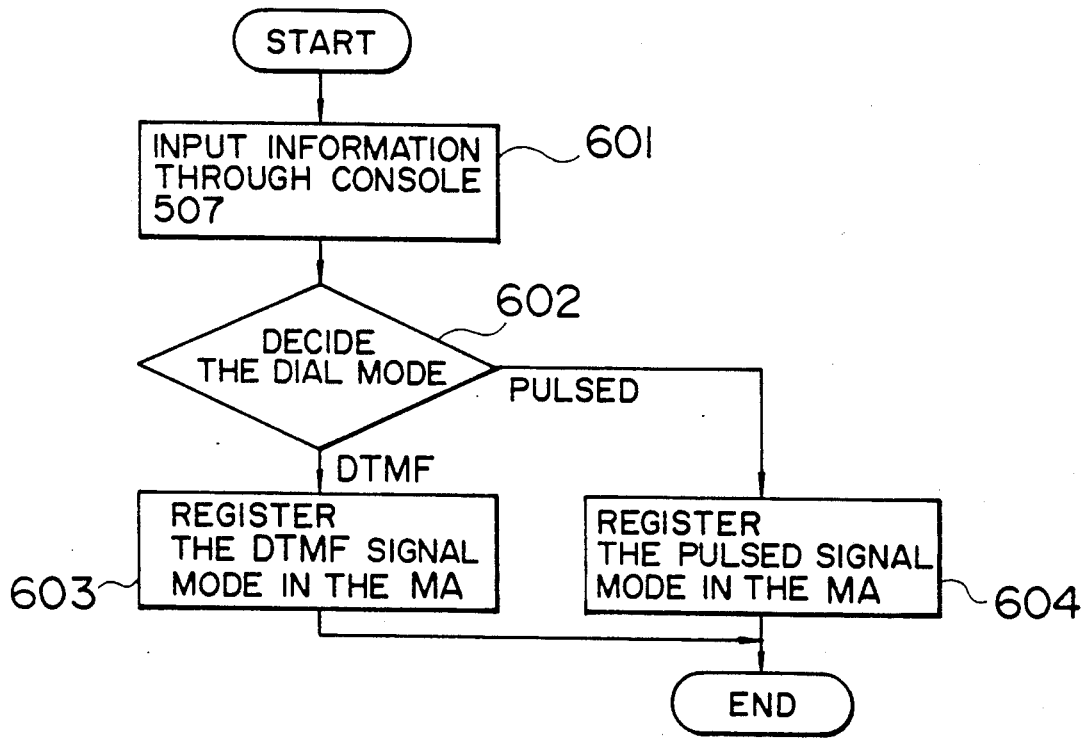
FIGS. 6 and 7 are flow charts showing processings in the FIG. 5 PBX.

Turning to FIG. 4, a timing chart shown therein is useful to describe in greater detail a series of steps 204 to 206 and steps 210 to 213.

Illustrated at section e) in FIG. 4 is the transmission state of a dial tone which is transmitted from the central office exchange 109 connected to the line 108, with the dial tone indicated by a hatched block. Illustrated at section f) are a DTMF signal and a pulsed signal which are transmitted from the PBX 100 to the line 108. The DTMF signal is indicated by a hatched block with numeral therein signifying a dial data piece.

When in step 204 the dial tone is detected at a time point h, the first digit of the dial data is transmitted, in step 205, in the form of the DTMF signal defined by a DTMF signal burst T termed "1" and an inter-digit pause I. In step 206, the central office exchange 109 detects the DTMF signal and it is decided at a time point h whether the dial tone has disappeared. In this case, the dial tone continues and therefore in step 210 the dial mode is settled to the pulsed signal mode so that in step 211 the first digit of the dial data is retransmitted at the time point h now in the form of a pulsed signal defined by a pulse signal P and the ensuing inter-digit pause I and the transmission of the dial data in the form of the pulsed signal continues through the succeeding steps 212 and 213 until the transmission of all dial data is completed. This transmission is defined by a pulse signal P termed "2" and an inter-digit pause I, a pulse signal P termed "3" and an inter-digit pause I and a pulse signal P termed "4" and an inter-digit pause I.

In the foregoing, dialing in step 205 is carried out using the DTMF signal but it may be done using the pulsed signal in place of the DTMF signal.

I claim:

1. A telephone apparatus comprising:
    signal transmission means for selectively transmitting either a dial signal of a first mode or a dial signal of a second mode to a central office line connected to said telephone apparatus;
    detection means for detecting the presence or absence of a dial tone coming from said line when said line is acquired; and
    recognition means for recognizing said line as a line for said first mode when said detection means detects disappearing of said dial tone after the transmission of said dial signal of the first mode from said signal transmission means but recognizing said line as a line for said second mode when the disappearing of said dial tone is not detected.

2. A telephone apparatus according to claim 1 further comprising:
    memory means for storing an indication of the mode recognized by said recognition means; and
    control means for causing said signal transmission means to operate in accordance with said mode stored in said memory means.

3. A private branch exchange comprising:
    signal transmission means for selectively transmitting to a central office line a dial signal in the form of either a DTMF signal or a pulsed signal;
    detection means for detecting the presence or absence of a dial tone coming from said line when said line is acquired;
    recognition means for recognizing said line as a DTMF dial signal line when said detection means detects disappearance of said dial tone after the transmission of said dial signal from said signal transmission means to said line; and
    memory means for storing results of recognition by said recognition means.

4. A private branch exchange according to claim 3 further comprising means for determining the type of the output signal from said signal transmission means in accordance with the information stored in said memory means.

5. A private branch exchange comprising:
    signal transmission means for selectively transmitting to a central office line a dial signal in the form of either a DTMF signal or a pulsed signal;
    detection means for detecting the presence or absence of a dial tone coming from said line when said line is acquired;
    recognition means for recognizing said line as a dial line for the DTMF signal when said detection means detects disappearance of said dial tone after the transmission of the DTMF signal from said signal transmission means to said line; and
    memory means for storing results of recognition by said recognition means.

6. A private branch exchange according to claim 5 wherein said recognition means recognizes said line as a dial line for the pulsed signal when said detection means does not detect the disappearing of said dial tone.

* * * * *